2,778,741
Patented Jan. 22, 1957

2,778,741
ELIMINATION OF HAZE FROM FINISHES

Ira Weber, Long Island City, N. Y., assignor to Interchemical Corporation, New York, N. Y., a corporation of Ohio No Drawing. Application March 2, 1953,
Serial No. 339,943

3 Claims. (Cl. 106—193)

This invention relates to a method and to compositions useful for the elimination of haze in finishes.

A hazy appearance is often visible in the case of multicoated wood finishes and also in the case of single coatings on paper, metal foil, Christmas bulbs, etc. This haze has been extremely vexatious to the trade and, up to now, no means have been found to eliminate it.

The occurrence of haze is particularly pronounced where first coats are applied which contain certain basic dyestuffs or pigments of basic dyes and where the article in question is finished with one or several lacquer top coats. However, a certain amount of haze may also occur in the case of coats or stains comprising water-soluble acidic type aniline dyes which may be dissolved in an ether-alcohol or glycol-ether and having one or several low boiling organic solvents such as methanol and toluol added thereto.

I have now found that the appearance of haze is due to fluorescence caused by the presence of very small amounts of various dyestuffs in single coatings or by the migration or bleed of small amounts of the dyestuffs or pigments from a first coat into lacquer top coats where it is present in form of a solution and from where it emits fluorescent energy.

My invention consists of the addition of a substance which acts either as absorbing agent for that wavelength or wavelengths of light that excite fluorescence, or acts as an absorbing agent for the fluorescent radiation emitted by the small amounts of dyestuff which are present in a single coating or have migrated into a lacquer top coat.

The substances which I found capable of acting in the aforesaid manner belong to the group of colored heavy metal salts which are soluble in a single coat vehicle such as a shellac-alcohol, or in a top coat lacquer which usually comprises a mixture of solvents such as aliphatic hydrocarbons and lower aliphatic alcohols and esters as well as a resin or nitrocellulose as the film-former. A list of such salts comprises: iron chloride, iron naphthalenate, iron tallate, iron octoate, iron fatty acid salts, cobalt naphthenate, cobalt octoate, copper oleate, nickel chloride.

It is significant that, in order to be useful for the aforestated purpose, the substance must be a heavy metal salt and must be colored. Thus, the dark-colored naphthenic acid used for making iron naphthenate, or the colorless 2-ethyl hexoic acid used for making iron octoate, do not eliminate haze in instances such as the aforedescribed. Nor will colorless salts, such as the lead salt of octoic acid or, for example, calcium bromide, act as an absorbing agent for the wavelengths of light which excite the fluorescence or for the fluorescent radiation emitted by small amounts of dyestuffs under the conditions as stated.

Depending upon the nature of the dyestuff and the stability of the solution of the dyestuff in the vehicle in the presence of one of the afore-said colored heavy metal salt dissolved in the vehicle, it is possible, in many instances, to add the heavy metal salt to the vehicle containing the dyestuff in solution and to obtain the desired effect. However, in case of several different coatings superimposed onto each other, such as in wood finishing, the heavy metal salt is preferably not added to the color stain. It is very plausible that the migration of the stain into the top coat may take place at a greater speed and at a higher concentration than any migration of the heavy metal salt, which, of course, will countenance fluorescence.

The following examples, in which the individual dyestuffs are identified by their color index numbers, will serve to illustrate the invention.

Example 1

A customary dark mahogany stain is produced on a wood surface by means of the following staining solution:

| | Parts |
|---|---|
| Nigrosine (C. I. 865) | 23.4 |
| Resorcin Brown (C. I. 234) | 17.8 |
| Brilliant Croceine M (C. I. 1252) | 18.5 |
| Orange II (C. I. 151) | 29.6 |
| Cellosolve | 455.0 |
| Methyl alcohol | 2,690.0 |

Example 2

A customary light mahogany stain is produced on a wood surface by means of the following staining solution:

| | Parts |
|---|---|
| Brilliant Croceine M (C. I. 1252) | 43.40 |
| Resorcin Brown (C. I. 234) | 18.24 |
| Naphthol Blue Black (C. I. 246) | 9.14 |
| Cellosolve | 438.00 |
| Methyl alcohol | 2,600.00 |

If one of the foregoing two stains is used at about the concentration set forth and the wood surface is thereafter treated in the usual manner by applying one of the commonly used wash coats, filler coats and one or several top coats with sanding and rubbing in between, the finished wood surface has a distinctive hazy appearance. However, if in the formulation of the wash coat or of the top coat one of the said colored, heavy metal salts in included, no haziness will occur.

Examples 3, 4 and 5

Typical examples for wash coats, or top coats, having one of the said colored, heavy metal salts incorporated therein, are the following:

3. 1 parts of a four pound cut shellac (37.11% shellac in ethanol) is diluted with 7 parts of ethanol, 100 parts of the final composition containing 5 parts of iron chloride.

4. A 7 percent solution of nitrocellulose in a solvent mixture consisting of 30 percent butyl acetate, 10 percent butanol, 60 percent toluol and having dissolved in 100 parts thereof 3 parts of cobalt naphthenate (6% Co).

5. A typical lacquer top coat, having 0.25 part iron octoate dissolved in 100 parts thereof.

As is the practice with inexpensive furniture, a top coat of this formulation can be applied immediately after staining, without filling and wash-coating. The presence of the heavy metal salt therein will eliminate any hazy appearance. On the other hand, it is obvious that, where a wash coat has been applied which contains a sufficient amount of the heavy metal salt to squash fluorescence, no heavy metal salt needs to be added to the top coat or top coats.

Attention is called to the differences in solubility of the heavy metal salts in question. Thus, since heavy metal salts such as heavy metal naphthenates or tallates and iron fatty acid salts are not soluble in alcohol, they cannot be used in conjunction with a wash coat of the type illustrated in Example 3. Instead, heavy metal salts such as iron chloride, iron octoate, copper chloride or nickel chloride must be used, which are soluble in alcohol.

*Example 6*

The following lacquer formulation produces a paper coating which is free from haze.

| | Parts |
|---|---|
| Cellulose acetate (viscosity range 2–4 sec.) | 19.1 |
| Methyl phthalyl ethyl glycollate | 11.7 |
| N-ethyl toluene sulfonamide | 2.4 |
| Acetone | 15.6 |
| Methyl ethyl ketone | 35.4 |
| Methyl cellosolve acetate | 6.7 |
| Ethyl lactate | 6.7 |
| Phosphotungstic toner of Rhodamine B (C. I. 749) | 1.9 |
| Iron naphthenate | 0.5 |

*Example 7*

The following lacquer formulation produces a gold colored aluminum-paper foil which is free from haze:

| | Parts |
|---|---|
| Nitrocellulose (viscosity 0.5 sec.) | 19.6 |
| "Glyptal 2477" | 13.8 |
| Ethyl acetate | 23.4 |
| Ethanol | 12.2 |
| N-butanol | 7.1 |
| Dibutyl phthalate | 5.5 |
| Butyl acetate | 5.7 |
| Cellosolve | 3.8 |
| Toluol | 7.6 |
| Auramine base (C. I. 665) | 0.3 |
| Iron tallate | 1.0 |

"Glyptal 2477" is the trade name of a 65% solution of castor oil fatty acid modified glycerol phthalic acid ester in xylol, containing, calculated on a solid basis, 35% phthalic anhydride and 45% castor oil fatty acids.

*Example 8*

The following lacquer formulation produces a brilliant red coating for Christmas bulbs which is free from haze:

| | Parts |
|---|---|
| Nitrocellulose (viscosity 25 cps.) | 5.30 |
| "Glyptal 2570" | 10.90 |
| Dioctylphthalate | 0.95 |
| Butylacetate | 20.00 |
| Methyl isobutyl ketone | 15.80 |
| Ethanol | 13.15 |
| N-butanol | 6.65 |
| Toluol | 26.75 |
| Rhodamine B base (C. I. 749) | 0.25 |
| Iron naphthenate | 0.25 |

"Glyptal 2570" is the trade name of a 60% solution of coconut oil fatty acid modified glycerol phthalic acid ester in xylol, containing, calculated on a solid basis, 43% phthalic anhydride and 30% coconut oil fatty acids.

Having described my invention, I claim:

1. The method of producing a transparent colored film of organic film forming material free of haze, and containing a fluorescent dyestuff which would normally produce haze in the film, which consists in adding to the composition used for producing the film, a small amount of a colored heavy metal salt soluble in the film forming composition and selected from the group consisting of salts of iron, cobalt, nickel and copper.

2. A composition capable of producing haze-free transparent finishes in conjunction with a fluorescent dyestuff which would normally produce haze in the film, comprising a volatile organic solvent solution of a film former which will produce a dry film on evaporation of the solvent, and a small amount of a colored heavy metal salt soluble in the composition and selected from the group consisting of salts of iron, cobalt, nickel and copper.

3. The composition of claim 2, in which the composition is a cellulose derivative lacquer.

References Cited in the file of this patent
UNITED STATES PATENTS

| 142,117 | Prentiss | Aug. 26, 1873 |
| 345,448 | Ramsdell | July 13, 1886 |
| 1,188,777 | Hewitt | June 27, 1916 |
| 1,789,122 | Theuman | Jan. 13, 1931 |
| 2,505,470 | Green | Apr. 25, 1950 |

OTHER REFERENCES

Munich, "Official Digest of Paint and Varnish Production" Clubs July 1950, pages 533–540.